Aug. 18, 1936.   J. V. BAUER   2,051,025
METHOD OF MAKING PLY BOARD
Filed June 17, 1936
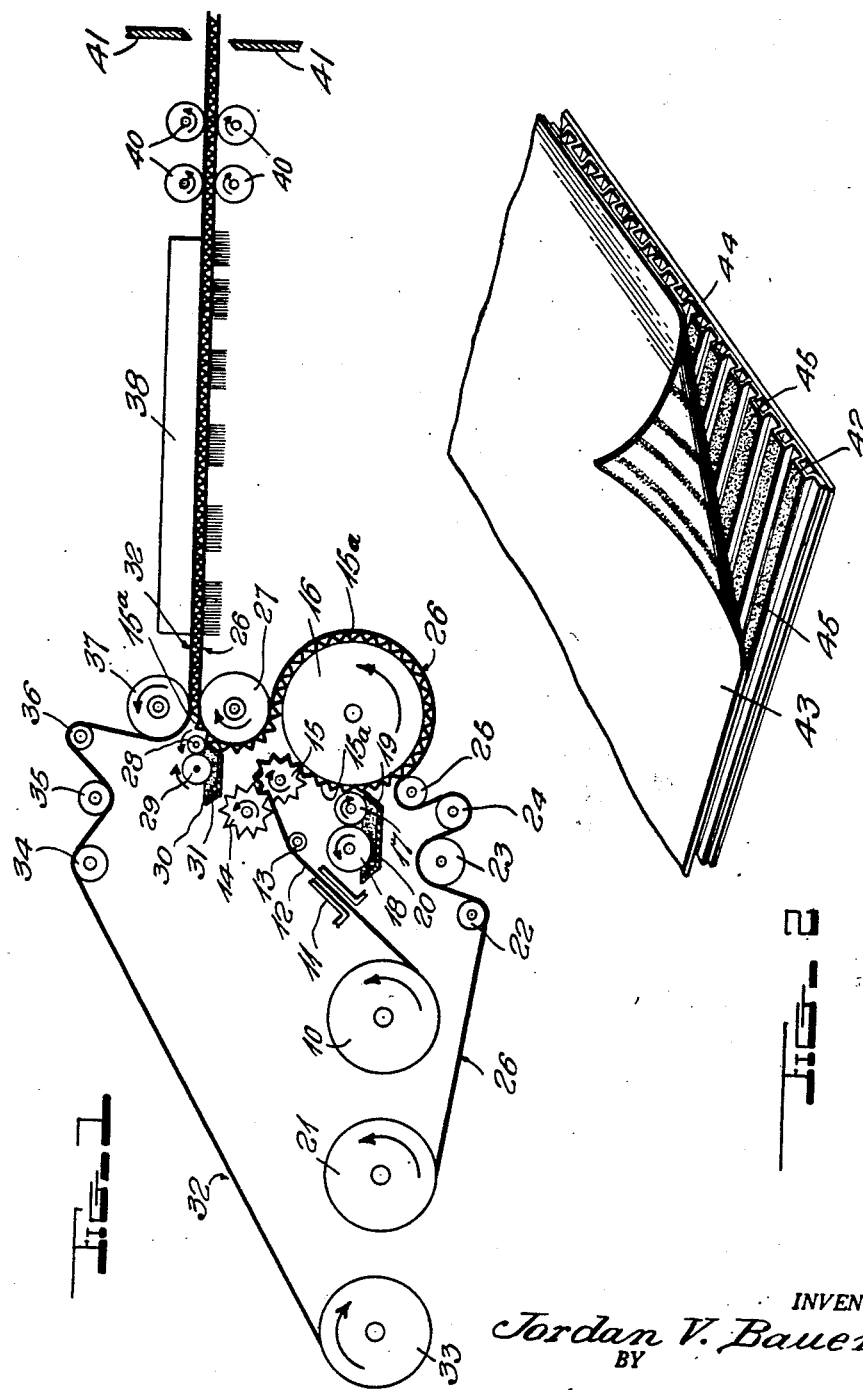
INVENTOR.
Jordan V. Bauer,
BY
Hoguet, Neary Campbell, ATTORNEYS.

Patented Aug. 18, 1936

2,051,025

UNITED STATES PATENT OFFICE 2,051,025

METHOD OF MAKING PLY BOARD

Jordan V. Bauer, Chicago, Ill., assignor to Stein, Hall Manufacturing Company, Chicago, Ill., a corporation of Delaware Application June 17, 1936, Serial No. 85,764

13 Claims. (Cl. 154—33)

My invention relates to laminated products and their method of manufacture and more particularly to corrugated paper board, using as the bonding agent for the several laminations the adhesive compositions of matter disclosed and claimed in my copending application, Serial No. 33,206 filed July 26, 1935.

This application is a continuation in part of my copending applications Serial No. 728,059 May 29, 1934 and Serial No. 10,837 March 13, 1935.

The usual method of making corrugated paper board is a continuous two step operation. It consists of corrugating a strip of paper by means of heated fluted rolls, applying an adhesive to the tips of the corrugations on one side, bringing a liner in contact with it and forming the bond with the assistance of heat and considerable pressure. This operation may be considered as the first step and forms what is known as a single faced corrugated board, comprising a corrugated strip of paper bonded to a smooth surfaced strip. The second step of the operation consists of applying an adhesive to the tips of the exposed corrugated surface, bringing a liner in contact with it and forming the bond with the assistance of heat and just sufficient pressure to hold the paper surfaces in contact. The result of these two operations is a stiff paper board comprising two smooth outer paper surfaces bonded to an inner core of corrugated paper.

In the manufacture of double faced corrugated board, the adhesive problem is considerably more difficult than that of adhesively combining two or more smooth surfaced strips of paper. In bonding two or more smooth surfaced strips of paper together in a continuous process, it is possible to apply any desired amount of pressure by means of rolls in order to assist the rapid formation of a bond. In the case of corrugated board, however, only a very small amount of pressure can be used to assist the formation of a bond between the single faced board and the second liner because of the danger of crushing the corrugation. As a result, points of poor contact develop where the corrugation tips do not touch the liner. It thus becomes necessary to apply a sufficient amount of adhesive to the tips of the corrugations so that there will be sufficient adhesive present to completely fill in any points of poor contact between the liner and corrugation tips. In order to compensate for these adverse conditions, it is customarily necessary in using silicate of soda adhesive to heat the board after the second liner has been brought into contact. The heating tends to dry the adhesive and make it set more rapidly. The heating period is relatively short, however, for the liminating machines operate at a high rate of speed, for example, between 175 and 325 feet of paper board per minute.

Because of these adhesive problems in connection with the manufacture of corrugated paper board, it is necessary that the adhesive used must be capable of a rapid increase in viscosity on the application of heat. When the board passes from the machine the adhesive must be sufficiently set-up to hold the bonded surfaces together and allow the board to be cut and otherwise handled. Up to the present time the only adhesive that possesses this characteristic to a satisfactory degree and is also of low cost is the silicate of soda type. This is true to the extent that practically all of the present day machines for making corrugated paper board have been designed and built with the idea of using silicate of soda as the adhesive.

In the manufacture of corrugated paper board, it is not essential that the adhesive used should form a bond of extremely high agglutinant strength inasmuch as it is only necessary that the bond be slightly stronger than the paper itself. The essential feature necessary in an adhesive for double faced corrugated paper board is the ability to rapidly form a bond between two paper surfaces under conditions of heat and low pressure and possible poor contact between the surfaces.

Gelatinized starches or stach derivatives such as dextrine have previously been used as adhesives but have not been found satisfactory. The reason for the superiority of silicate of soda over such starch adhesives for use with laminated paper such as corrugated paper lies in the fact that silicate of soda adhesives develop a very decided increase in viscosity with a small decrease in their moisture content, whereas, in the case of gelatinized starch or starch derivative, adhesives, the increase in viscosity is relatively very small with a corresponding decrease in moisture content.

In the manufacture of corrugated board it is not necessary and often not possible that the adhesive bond be completely dry when the board comes off the machine as the complete drying out can be accomplished later more conveniently when the board is in the pile. It is necessary, however, that the board be bonded sufficiently to allow its being cut, scored and handled when it comes off the machine. This being the case and inasmuch as the time required to form a bond with any adhesive is the time necessary for the adhesive to develop sufficient viscosity to hold the paper together at the points of contact, it can be readily seen that under the same conditions of spread, temperature and moisture absorption by the paper, the silicate of soda adhesive will always form a sufficient degree of bond in less time than a gelatinized starch adhesive, for example. This is particularly true when the cost situation makes it necessary to use considerably more water in the starch adhesive than is used in the silicate of soda adhesive. As a result, gelatinized starch adhesives have never been able to successfully compete with silicate of soda from the standpoint of production speed when used on corrugating machines making double faced corrugated board.

I have discovered that it is possible to produce laminated products such as corrugated paper board, using the starch adhesive disclosed in my copending application, supra, that are not only competitive from the standpoint of cost with the prior art products using silicate of soda as the bonding adhesive but in fact are of a superior quality. Furthermore, the process of manufacture of the board using this starch adhesive is characterized by a greater speed of bond formation than the prior art process using silicate of soda. As a specific example, the machines for manufacturing my new corrugated paper board, when using my new adhesive, may be operated from ten to twenty per cent faster than would be otherwise possible.

The laminated paper board of my invention does not cause discoloration, staining or tarnishing of the materials wrapped or enclosed in this board particularly because of the fact that the bonding agent used for uniting the several plies of the board has an extremely low alkalinity characteristic.

An object of my invention is to provide a new and improved type of laminated product such as corrugated paper board that is superior to the laminated products produced with silicate of soda adhesive and that can be manufactured with substantially greater speed and less cost.

I have discovered that a superior laminated product may be produced by using as the bonding agent for the several laminations ungelatinized starch in conjunction with a suitable carrier or suspension medium. I have also found that the final characteristics of the board are somewhat dependent upon the balance or relationship between the ungelatinized starch, as the potential adhesive, and the carrier or suspension medium. While it is true that the adhesive disclosed and claimed in my copending application, supra, may be used for various purposes other than laminated products, the corrugated paper board and like products of the present invention are largely dependent for their superior characteristics upon the use of this adhesive. The salient features of this adhesive and its pertinency to the present invention are discussed below.

This adhesive, which I use as the bonding agent for my laminated products, differs from silicate of soda or a gelatinized type of starch adhesive in its bonding function. In my laminating operations, using this adhesive, the time required to form an adhesive bond between two pieces of paper under conditions wherein heat and light contact pressure are applied, is for the most part independent of the rate at which the moisture in the adhesive is driven off by heat or absorbed by the paper. Rather it is mainly the time required to heat the paper and adhesive to the gelatinization temperature of the suspended ungelatinized starch. Water is taken up by the starch as the starch gelatinizes and the viscosity of the adhesive mixture is raised to such an extent that an immediate bond is formed. Because of the great extent to which the viscosity can be increased by this method, it is possible to use from three to five parts of water to one part of dry material in my type of adhesive and still obtain a sufficient viscosity increase upon the application of heat to bond the paper satisfactorily when it comes off the machine.

The principal factors that determine the suitability of a starch for the ungelatinized starch portion of the bonding agent used in the laminated products of my present invention are as follows:

1. The time required to completely gelatinize the starch in water by means of heat.
2. The temperature at which the starch gelatinizes.
3. The viscosity developed by the starch after gelatinization.
4. The degree of tackiness developed after gelatinization.

It is desirable that the starch component of the bonding agent used in my laminated products gelatinize very rapidly so that it will develop a high degree of viscosity in a short length of time. This factor will determine the rate of speed at which the paper can be bonded on the machine.

It is desirable that this starch have a fairly low temperature of gelatinization in order that it will be within the temperature range developed on the machine. This factor will also determine the speed at which the paper can be bonded on the machine.

It is desirable that this starch develop a high degree of viscosity on gelatinizing because this factor will largely determine the amount of water that can be used in the adhesive formula. The greater the viscosity developed, the larger the amount of water that may be used, which will reduce the cost. Also, the greater the viscosity, the greater the strength of the bond which holds the paper together when it comes off the machine. The balance between these factors depends on the type of operation and type of laminated product desired by the user.

It is desirable that the starch upon gelatinization form a tacky or sticky gel as this tends to insure against breakage of the newly formed bond when the board is handled soon after coming off of the machine.

In regard to the portion of my adhesive which forms the carrier or suspension medium for the ungelatinized starch portion, it is desirable that this material be of such a nature that it may be prepared with water to form a free flowing solution or colloidal solution of sufficient viscosity to hold the granules of ungelatinized starch in suspension, and also enable the adhesive to be picked up by the rolls of the machine and applied to the paper.

The more essential features desired in a carrier for my purpose are as follows:—

1. It should hold the ungelatinized starch portion of the adhesive in a state of suspension and thus prevent any undue separation or settling out of the ungelatinized starch granules.
2. It should pick up evenly and well on the smooth rolls of a corrugating machine, for example, and act as a medium for transferring the adhesive to the paper to be bonded.
3. It should be of sufficient viscosity to enable the adhesive to stand up on the surface of the paper after it has been applied and yet it should be of such a nature that it will effectively wet the paper surfaces to be bounded.
4. It should not cause the adhesive to foam in the glue boxes of the machine.
5. It should be capable of imparting sufficient viscosity to the adhesive to enable it to function properly even when, for example, from two to seven parts of water are used.

I have found the best carrier for these purposes is a gelatinized starch solution sufficiently modified by oxidizing agents or other means, such as partial dextrinization, to bring the viscosity characteristics within the desired range. Dextrins, for example, starch gums, may be used as agents for forming a carrier of the desired viscosity and water-holding characteristics. Certain types of vegetable gums may also be used, for example, gum arabic, locust bean gum, agar agar, Irish moss, gum karaya and also certain glutens and gelatines. These substances are capable of taking up large amounts of water.

The carrier or suspension medium has been referred to as gelatinous or as having gelatinous characteristics. I have used these terms in their more popular sense to indicate the viscous hydrogel or hydrosol carrier medium of my invention as contrasted with those other mediums which with relatively small amounts of water produce viscous solutions. I have clearly indicated the characteristic desired in my carrier. Thus, I do not wish to be limited by my terminology in this connection to a strictly gelatinous substance. It will be noted, for example, that I have proposed to use hydrosol carriers such as dextrins, starch gums and vegetable gums, as well as hydrogel carriers such as gelatinized starch. In the use of the terms gelatinous I intend to include all such types of substances having the desired characteristics whether or not they contain additional components as in the case of certain types of flours and irrespective of any preliminary treatments to which they may have been previously subjected.

The use of the terms ungelatinized starch or ungelatinized amylaceous material I intend to include all substances containing such ungelatinized starchy component or components capable of taking up water upon being subjected to heat, irrespective of any preliminary treatment such as partial gelatinization or conversion. It is only necessary that there be such a proportion of ungelatinized starchy components present in my potential adhesive as to provide the necessary effective increase in viscosity upon the application of heat in situ to form an effective bond. For example, certain ungelatinized starch gums might ordinarily be considered as a converted material. However, the ungelatinized starchy components present in such gums are available and effective to give the desired bonding action in situ as described in this specification.

The formulas for several adhesives that I have found in practice to be very satisfactory as bonding agents for my laminated products and particularly for the corrugated board manufactured with the present types of corrugating machines, are as follows:

Formula #1

The carrier portion of the adhesive is prepared as follows:

| Blend | Per cent |
|---|---|
| Tapioca flour | 45 |
| Soda ash | 16 |
| Calcium hydrate | 12 |
| Barium peroxide | ½ |
| Clay (300 mesh) | 26½ |

45 lbs. of this blend is mixed with 168 lbs. of cold water for a period of about 30 minutes. During this mixing period the starch in the mixture is gelatinized by the caustic soda formed by the reaction between the soda ash and lime. Subsequently, this gelatinized starch is acted on by the barium peroxide which thins it out to a smooth fluid consistency. At the end of this time, 1 pint of formaldehyde is added to the mixture to stop any further action of the barium peroxide and the mixture is diluted with an additional 400 lbs. of water. Other aldehydes as well as sulphurous acid, bisulphites or other suitable reducing agents may be substituted for the formaldehyde.

The ungelatinized potentially adhesive base portion of the adhesive contains the following:

| | Pounds |
|---|---|
| Tapioca flour | 140 |
| Borax | 3 |
| Water | 184 |

These three materials are mixed in a separate container and then added to the carrier, prepared as above. The resulting mixture containing the gelatinized carrier and ungelatinized base is then agitated for about 30 minutes, or until a perfectly homogeneous and free flowing product is obtained. In this condition it is ready for use on the corrugated paper fabricating machine.

The above formula gives approximately 100 gallons of an adhesive product containing ungelatinized tapioca starch suspended in a hydrosol carrier medium of modified gelatinized tapioca starch and is a specific example of an adhesive, using the principles of my invention that has proven satisfactory in actual practice.

Formula #2

The carrier portion of the adhesive is prepared as follows:

| Blend | Per cent |
|---|---|
| Tapioca flour | 45 |
| Soda ash | 20 |
| Calcium hydrate | 15 |
| Barium peroxide | ½ |
| Clay (300 mesh) | 19½ |

45 lbs. of this blend is mixed with 168 lbs. of cold water for a period of about 30 minutes. During this mixing period the starch in the mixture is gelatinized by the caustic soda which is formed and is subsequently acted on by the barium peroxide, which thins it out to a smooth fluid consistency. At the end of this time, 1 pint of formaldehyde is added and the mixture diluted with an additional 400 lbs. of water.

The ungelatinized potentially adhesive base portion of the adhesive contains the following:

| | Pounds |
|---|---|
| Corn starch | 140 |
| Borax | 3 |
| Water | 184 |

These three materials are mixed in a separate container and then mixed with the carrier. The resulting mixture containing the gelatinized carrier and ungelatinized base is then agitated for about 30 minutes, after which it is ready for use on the machine.

The above formula is similar to Formula #1, with the exception that instead of tapioca flour, corn starch is used for the ungelatinized starch portion of the adhesive. The amount of soda ash and lime is increased over that used in Formula #1 so as to form a larger amount of caustic soda and thus lower the gelatinization temperature of the corn starch and increase its speed of gelatinization. This formula also has been proven commercially satisfactory by actual operation on corrugating machines under conditions of commercial operation.

In both of the examples mentioned above, soda ash and lime are used as a convenient means of introducing caustic soda into the formula. The caustic soda thus formed not only acts as a means of gelatinizing the starch in the carrier, but also subsequently acts as a means of lowering the gelatinization temperature and increasing the gelatinization speed of the ungelatinized starch portion of the adhesive when the bond is formed on the machine.

The barium peroxide when used with soda ash and lime has the property of acting on the starch carrier medium at temperatures below 100° F. and thus it is possible to obtain a gelatinized starch carrier medium of the desirable viscosity characteristics by means of a cold mix. In any of these formulae, as an alternative, the barium peroxide may be added in the desired amount to the starch carrier after water has been added.

The clay as used in the formula set forth above is an inert filler which is not essential to the success of the adhesive. It is used in this particular case merely to prevent undue lumping up of the carrier mixture when it is added to the water.

The borax used in the formula performs the function of increasing the degree of viscosity developed by the adhesive on the machine and thus enables the use of the large amounts of water specified in the above formulae.

As an alternative to the use of borax as a viscosity increasing agent in developing the adhesive bond in situ sodium aluminate as well as other soluble borates and aluminates can be used.

Several other examples of adhesives suitable for use in my corrugated board and other laminated products are as follows:

Formula #3

| Blend | Per cent |
|---|---|
| Corn starch | 88.5 |
| Calcium hydrate | 4.5 |
| Soda ash | 6.0 |
| Barium peroxide | 1.0 |

35 lbs. of this blend is dispersed in 140 lbs. of cold water. To this mixture is added 2.75 lbs. of caustic soda dissolved in 10 lbs. of water. After the starch gelatinizes, the mixture is agitated about 20 minutes during which time it is thinned out by the action of the barium peroxide to a smooth fluid consistency. At the end of this time, 1 pint of formaldehyde is added and the mixture diluted with an additional 400 lbs. of water.

The ungelatinized potentially adhesive base portion of the adhesive contains the following:

| | |
|---|---|
| Corn starch | lbs 160 |
| Sulphonated castor oil | pint 1 |
| Borax | lbs 2 |
| Water | lbs 190 |

These four materials are mixed in a separate container and then mixed with the carrier. The resulting mixture containing the gelatinized carrier and ungelatinized base is then agitated for about 30 minutes, after which it is ready for use on the machine. In this formula, a modified gelatinized corn starch is used as the carrier medium and corn starch is also used for the ungelatinized portion of the adhesive.

Other of the various water soluble sulphonated oils, alcohols, soaps or fatty substances effective as wetting agents can be used to improve the smoothness of pickup by the rolls and transfer to the paper of the adhesive and to improve the wetting effect of the adhesive so that it may be more easily applied to various types of papers. The use of these substances has been found desirable with certain types of machines.

Formula #4

50 lbs. of partially dextrinized starch are cooked with 250 lbs. of water to a temperature of 190° F. and then cooled to a temperature of below 100° F. In a separate container, 100 lbs. of tapioca, rye or potato starch are mixed with 200 lbs. of water and added to the above mixture. The material is then mixed until homogeneous, after which it is ready to run on the machine.

An adhesive formula of this type is of advantage when an adhesive is desired which must be free from alkaline substances. In this specific instance a cooked partially dextrinized starch is used as the carrier medium. The degree of dextrinization should be such that the final viscosity of the adhesive when mixed up is about the same as that of 38° to 40° Bé. silicate of soda. Either tapioca, rye, or potato starches or blends are specified for the ungelatinized starch in this non-alkaline formula because they gelatinize rapidly enough to enable the adhesive to be used satisfactorily on the machines without the necessity of adding caustic soda to further increase the speed of gelatinization.

If it is desired to use corn starch in a formula of the non-alkaline type, it is usually necessary on high speed machines to add sufficient amounts of such chemicals as: zinc chloride, calcium chloride, urea, formaldehyde, etc., which are non-alkaline and yet have the property of lowering the gelatinization temperature of starches, in order to bring the setting time of the adhesive within the speed range of the machine.

The above formulae for adhesives, which are suitable as bonding agents for my laminated products, are merely specific examples of those that I have found to be satisfactory in actual practice. Therefore, I do not intend to limit my invention in laminated products to the use of these specific adhesives for various modifications and substitutions may be made in them without departing from my invention.

I appreciate that the Duerden Patent No. 620,756 issued in 1899 discloses a process for manufacturing a corrugated paper board using a starch and water suspension as the adhesive material which is converted into a bonding agent upon the application of heat. However, this patent fails to appreciate the necessity for the use of a carrier with the starch to obtain a successfully operative process. In accordance with my present invention, I have developed, for the first time, a commercially successful laminating process using an amylaceous type adhesive as the bonding agent. As contrasted with Duerden my invention includes the novel combination of a potentially adhesive ungelatinized amylaceous material and a hydrosol or hydrogel carrier sufficiently viscous to prevent undue settling out of the ungelatinized starch component and to prevent undue absorption of the adhesive by the paper. This combination provides for a rapid formation of an effective bond during the laminating process.

I have already noted some of the advantages to be obtained in the manufacture of laminated products when using as the bonding adhesive my novel combination of starch with a viscous carrier, for example, the increased speed of bonding operation possible; the even distribution of the starch by preventing settling and separation of the starch; the even and sure transfer of the adhesive to the surface to be bonded; the ability of the adhesive to stand on the surface to compensate for uneven positioning of the surfaces; the characteristic of wetting the surface to obtain a sure bond without such absorption as to result in a starved joint or bond; and the characteristic of carrying sufficient water to make the final cost attractive commercially while retaining a viscosity and other characteristics to give a successful operation and bond. There are other advantages and properties of my adhesive and operation which will become apparent to those skilled in this art.

I have found that the temperature of gelatinization of the ungelatinized starch portion of the adhesive used in my laminated products may be lowered if desired and the speed of gelatinization increased. Such lowering of the gelatinization temperature might be desired, for example, if the natural gelatinization point of a given starch were above the temperature acquired by the paper surfaces and bonding adhesive passing through the laminating machine. Also, it might be found desirable to make more certain that all the ungelatinized starch component becomes gelatinized during passage in order to bring the setting time of the adhesive within the speed of the machine. This lowering of the gelatinization point and increasing the rate of gelatinization, may also be desired for the purpose of increasing the rate at which the paper surfaces can be processed, for an increase in rate of passage would normally result in a lower temperature at the bond. I have found in this connection that caustic soda or calcium hydrate and soda ash or equivalent hydroxy compounds of the alkali and alkaline earth metals, capable upon reaction to form gelatinizing agents or zinc chloride, calcium chloride, urea, and formaldehyde, when mixed with my adhesive in proportions insufficient to completely gelatinize the ungelatinized starch present, act to lower the gelatinization point or temperature of the ungelatinized starch and increase the rate of gelatinization for the purpose referred to above.

The proportion of carrier material and ungelatinized starch base in the adhesive used in my laminated products may be varied through a fairly wide range while still obtaining satisfactory results. For example, a satisfactory adhesive of this type can be made up with as little as 15% ungelatinized starch and as much as 85% carrier material on a dry basis, if the amount of water used in the formula is limited to less than 2½ parts of water to 1 part of the total dry materials used. In general, the smallest proportion of ungelatinized starch that can be used in an adhesive composition for my purposes is that amount which upon complete gelatinization after being subjected to heat in passage through the fabricating machine will give an apparent and usable increase in viscosity resulting in an immediate adhesive or bonding action.

The greatest proportion of ungelatinized starch that can be used in the adhesive composition for my purposes is determined by the amount of water used in the formula and by the amount of carrier material necessary to give the finished composition sufficient viscosity to operate successfully on the machines, which takes into consideration all of the factors of my adhesive already enumerated.

It is necessary that the viscosity developed by this adhesive composition when it is completely gelatinized on the machine be sufficient to hold the paper plies together when they come off the machine so they may be cut and handled as a unit without breakage of the bond. It is this factor which determines the greatest proportion of water that can be used in the adhesive composition which serves as the bonding agent for my new laminated products.

One illustrative embodiment of my invention in laminated products and particularly as applied to the manufacture of corrugated paper board is described below and illustrated in the accompanying drawing in which:

Figure 1 is a diagrammatic representation of a system of making corrugated paper board in which the several paper plies are bonded together by means of the special type of starch adhesive described above, and Figure 2 is a perspective view of a laminated corrugated paper board made in accordance with my invention, the top layer of paper being partially separated from the inner core to illustrate the method of uniting.

Referring now to Figure 1, the various mechanisms of this system have been illustrated entirely in diagrammatic form since they are not, per se, a part of this invention. My invention may be carried out by means of various other types of machinery than that illustrated in Figure 1 and furthermore, it is not limited to the manufacture of the specific type of corrugated paper board shown in Figure 2 but may be applied to the manufacture of numerous other types of laminated products, made by similar methods. However, the following description of the operation of the system in Figure 1 will serve to illustrate one specific application of my invention:

The paper, which is to form the core of the corrugated paper board made in the system shown in Figure 1, is stored upon the supply roll 10. During operation, this paper is unwound from the roll 10 and passes between steam jets 11, which emit a flow of steam for moistening and softening the strip of paper 12. After passing through the steam jets 11, the strip 12 passes over the guide roll 13 and thence between the two corrugated rolls 14 and 15, which rotate in such a manner that the strip of paper 12 is crimped or folded into substantially rectangularly shaped portions.

After leaving the corrugated roll 15, the corrugated strip of paper 15a, passes on to the much larger roll 16, which for clearness of illustration is shown as a smooth surface roll but may be corrugated if desired, and there comes into contact with the adhesive supplying roll 17. This roll 17 is caused to rotate and is supplied with one of the carbohydrate ungelatinized types of adhesive materials, such as those described hereinbefore, by means of the roll 18, which is suspended in the container 19 filled with the adhesive material 20. The adhesive covered roll 17 causes a coating of the adhesive to be applied to the convex portions on one side of the corrugated strip of paper 15a passing around the periphery of the roll 16. A little further around the roll 16, the corrugated paper 15a comes in contact with another strip of paper 26, which is to form one of the liners in the final product. This strip of paper 26 is supplied from supply roll 21, and is brought into contact with the corrugated strip of paper 15a by means of the guide and tension rolls 22, 23, 24 and 25. The roll 25 causes the strip of paper 26 to come into intimate contact with the coated portions of the corrugated strip of paper 15a on the roll 16, so that the two strips are caused to be united. The roll 16 is preferably heated by means of steam for the purpose of drying the steam-moistened paper 15a and for causing the adhesive to unite the liner strip 26 to the corrugated coil 15a.

The corrugated strip 15a and the liner 26 united thereto now pass around the roll 27 in such a manner that the uncoated side of the corrugated strip 15a is brought into contact with a second adhesive supply roll 28. This roll 28 is caused to rotate and is supplied with adhesive material by means of the roll 29 suspended in the container 30, which is filled with the ungelatinized adhesive material 31. The roll 28 applies a coating of my adhesive material to the convex portions of one side of the corrugated strip 15a in the same manner as the first adhesive-supplying roll 17 coated the reverse side of this corrugated strip. As the corrugated strip 15a, which now has a liner 26 united to one of its surfaces and has an adhesive coating deposited on the ridges of its other surface, leaves the roll 27, it comes into contact with the strip of paper 32 which is to form the other liner. This strip of paper 32 is supplied from the supply roll 33 and is brought into contact with the coated side of the corrugated strip 15a by means of the guide and tension rolls 34, 35, 36 and 37.

After leaving the roll 37, the assembly, comprising the inner corrugated strip of paper 15a, a top liner 32 and a bottom liner 26 passes between the hot plate 38 and the brushes 39. The heat from the hot plate 38 is for the purpose of converting the ungelatinized portion of the adhesive material, which has been previously deposited between the core and the outside liners, to a gelatinized state. This heat treatment so modifies the starch adhesive that the viscosity is increased to a point where it becomes effective as a bonding agent and partially dries it. The brushes 39 serve the purpose of keeping the paper board assembly in slight contact with the hot plate 38 during the time of heating.

The rubber covered rolls 40 serve to pull the three strips of paper 15a, 26 and 32, through the entire system. The finished paper board, leaving the rolls 40, is cut to any desired length by means of the cutters 41.

The hot plate 38 shown in Figure 1, is operated at a temperature of approximately 250° F. to 375° F. The paper board is fed past the hot plate at a rapid rate, which, depending upon the kind of paper being used and also production requirements, varies between 175 to 325 feet per minute. Even at the top speed of 325 feet per minute, the originally ungelatinized adhesive material of my invention will be converted to a gelatinized form and set to form a strong bond between the several pieces of paper of which the board is made.

Referring now to Figure 2, a piece of paper board of the type made in the system of Figure 1 is illustrated. This board comprises a corrugated inner core 42 and two liners 43 and 44. These liners are firmly united to the core by means of the gelatinized adhesive material, converted to that form in situ, a portion of which is shown at 45. The carrier portion of my adhesive acts in some cases to size the paper at the bond, thus forming a better base on each paper surface for the bonding agent. When the adhesive 45 is one of the types which I have described above, and is used for uniting the originally separate pieces of paper in accordance with the method described above in connection with Figure 1, the board will possess the advantages and improvements outlined hereinabove as characteristic of my invention and will be void of the disadvantages and limitations of the prior types of paper board to which reference has previously been made.

While I have described only a specific form of product and operation, these are to be considered merely as illustrative of my invention. For example, the potential adhesive may be applied to a liner in narrow spaced applications and the operation so synchronized as to bring the corrugated tips of the core into contact with such applications. Other modifications and improvements within the scope of my invention will probably become apparent to those skilled in this art. The appended claims indicate some of the novel features of my invention.

I claim:

1. The process of continuously forming a corrugated paper board having a corrugated core and at least one paper liner attached thereto which includes the steps of continuously applying to the tips of the corrugations a potential adhesive comprising a mixture of ungelatinized starch and a gelatinous aqueous carrier medium of such viscous nature as to carry said ungelatinized starch in a state of relatively permanent and uniform suspension and to permit the retention of said viscous mixture on the tips substantially as applied without material absorption of the aqueous content by the paper, bringing said corrugated core and applied potential adhesive continuously into contact with a liner to form an assembly and continuously passing said assembly with its potential adhesive through a heating zone whereby sufficient of the ungelatinized starch component is gelatinized to thereby render the potential adhesive effective to give an immediate adhesive bond for uniting said liner and corrugated core.

2. The process of continuously forming a corrugated paper board having a corrugated core and at least one paper liner attached thereto which includes the steps of continuously applying to the tips of the corrugations a potential adhesive comprising a mixture of ungelatinized starch and a gelatinized starch carrier medium of such viscous nature as to carry said ungelatinized starch in a state of relatively permanent and uniform suspension and to permit the retention of said viscous mixture on the tips substantially as applied without material absorption by the paper, bringing said corrugated core and applied potential adhesive continuously into contact with a liner to form an assembly and continuously passing said assembly with its potential adhesive through a heating zone whereby sufficient of the ungelatinized starch component is gelatinized to thereby render the potential adhesive effective to give an immediate adhesive bond for uniting said liner and corrugated core.

3. The process of continuously forming a corrugated paper board having a corrugated core and at least one paper liner attached thereto which includes the steps of continuously applying to the tips of the corrugations a potential adhesive comprising a mixture of ungelatinized starch and a vegetable gum gelatinous aqueous carrier medium of such viscous nature as to carry said ungelatinized starch in a state of relatively permanent and uniform suspension and to permit the retention of said viscous mixture on the tips substantially as applied without material absorption by the paper, bringing said corrugated core and applied potential adhesive continuously into contact with a liner to form an assembly and continuously passing said assembly with its potential adhesive through a heating zone whereby sufficient of the ungelatinized starch component is gelatinized to thereby render effective the potential adhesive to give an immediate adhesive bond for uniting said liner and corrugated core.

4. The process of continuously forming a corrugated paper board having a corrugated core and at least one paper liner attached thereto which includes the steps of continuously applying to the tips of the corrugations a potential adhesive comprising a mixture of ungelatinized starch and a gelatinous aqueous carrier medium comprising clay and of such viscous nature as to carry said ungelatinized starch in a state of relatively permanent and uniform suspension and to permit the retention of said viscous mixture on the tips substantially as applied without material absorption by the paper, bringing said corrugated core and applied potential adhesive continuously into contact with a liner to form an assembly and passing said assembly with its potential adhesive through a heating zone whereby sufficient of the ungelatinized starch component is gelatinized to thereby render the potential adhesive effective to give an immediate adhesive bond for uniting said liner and corrugated core.

5. The process of continuously forming a corrugated paper board comprising a corrugated core and a paper liner attached thereto which includes the steps of continuously applying to the tips of the corrugations a potential adhesive mixture comprising ungelatinized starch having the property of taking up water upon the application of heat, said starch being suspended in a gelatinous water-containing viscous carrier medium, bringing said corrugated core and applied potential adhesive continuously into contact with a liner to form an assembly and continuously passing said assembly with its potential adhesive through a heating zone whereby the suspended ungelatinized starch takes up water from said carrier, the amount of water present in said carrier being such that the suspended starch takes up a sufficient amount of the same to allow substantially complete gelatinization and to cause an immediate and effective increase in viscosity of said mixture within said heating zone resulting in an adhesive bond for uniting said liner and corrugated core.

6. The process of continuously forming a corrugated paper board assembly comprising a corrugated paper core and a paper liner attached thereto which process includes the steps of continuously applying to one paper portion of said assembly a potential adhesive in a series of spaced relatively narrow applications, said potential adhesive mixture comprising ungelatinized amylaceous material having the property of taking up water upon the application of heat suspended in a gelatinous, water-containing, viscous carrier medium, bringing said paper portion with the applied potential adhesive continuously into contact with the other paper portion to form an assembly and continuously passing said assembly with its potential adhesive through a heating zone whereby the suspended ungelatinized amylaceous material takes up water from said carrier, the amount of water present in said carrier being sufficient to allow said ungelatinized amylaceous material to become substantially gelatinized within said heating zone, the amount of water present in said carrier being present in such a small proportion that the amount taken up by said ungelatinized amylaceous material will cause an immediate and effective increase in viscosity of said mixture resulting in an adhesive bond for uniting said liner and corrugated core.

7. The process of continuously forming a corrugated board assembly comprising a corrugated paper core and a paper liner attached thereto which process includes the steps of continuously applying to one paper portion of said assembly a potential adhesive in a series of spaced relatively narrow applications, said potential adhesive comprising a mixture of ungelatinized amylaceous material capable of taking up water upon the application of heat and a gelatinous aqueous carrier medium of such viscous nature as to carry said ungelatinized amylaceous material in suspension and to permit the retention of said viscous mixture substantially as applied without material spreading and without material absorption of the aqueous content by the paper, bringing said paper portion with the applied potential adhesive continuously into contact with the other paper portion to form an assembly and continuously passing said assembly with the applications of potential adhesive in contact with the assembled paper through a heating zone whereby sufficient ungelatinized amylaceous material is gelatinized to increase the viscosity to give an immediate and effective adhesive bond for uniting said assembly.

8. The process of continuously forming a corrugated board assembly comprising a corrugated paper core and a paper liner attached thereto which process includes the steps of continuously applying to at least one paper portion of said assembly a potential adhesive in a series of spaced relatively narrow applications, said potential adhesive comprising a mixture of ungelatinized amylaceous material capable of taking up water upon the application of heat and a gelatinous aqueous carrier medium comprising a substance selected from the group consisting of gelatinized starches, dextrins and starchy gums, said carrier having such a viscous nature as to carry said ungelatinized amylaceous material in suspension and to permit the retention of said viscous mixture substantially as applied without material spreading and without material absorption of the aqueous content by the paper, bringing said paper portion with the applied potential adhesive continuously into contact with the other paper portion to form an assembly and continuously passing said assembly with the applications of potential adhesive in contact with the assembled paper through a heating zone whereby sufficient ungelatinized amylaceous material is gelatinized to increase the viscosity to give an immediate and effective adhesive bond for uniting said assembly.

9. The process of continuously forming a corrugated paper board having a corrugated core and at least one paper liner attached thereto which includes the steps of continuously applying to the tips of the corrugations a potential adhesive comprising a mixture of ungelatinized amylaceous material and a gelatinous aqueous carrier medium of such viscous nature as to carry said ungelatinized amylaceous material in a state of relatively uniform suspension and to permit the retention of said viscous mixture on the tips substantially as applied without material absorption by the paper, bringing said corrugated core and applied potential adhesive continuously into contact with a liner to form an assembly and continuously passing said assembly with its potential adhesive through a heating zone whereby sufficient of the ungelatinized amylaceous component is gelatinized to thereby render the potential adhesive effective to give an immediate adhesive bond for uniting said liner and corrugated core.

10. A process of continuously forming a corrugated paper board assembly comprising a corrugated paper core and a paper liner attached thereto, which process includes the steps of continuously applying to one paper portion of said assembly a potential adhesive in a series of spaced relatively narrow applications, said potential adhesive mixture comprising ungelatinized amylaceous material having the property of taking up water upon the application of heat suspended in a gelatinous, water-containing, viscous carrier medium, and an agent for increasing the viscosity of the ungelatinized starch upon gelatinization selected from the group consisting of soluble borates and aluminates, bringing the paper portion with the applied potential adhesive continuously into contact with the other paper portion to form an assembly and passing said assembly continuously with its potential adhesive through a heating zone whereby ungelatinized amylaceous material is gelatinized in situ in the presence of a substance selected from the group consisting of soluble borates and aluminates and takes up water from said carrier, the amount of water present in said carrier being sufficient to allow said ungelatinized amylaceous material to become substantially gelatinized within said heating zone, the amount of water present in said carrier being present in such a small proportion that the amount taken up by said ungelatinized amylaceous material will cause an immediate increase in viscosity of said mixture resulting in an adhesive bond for uniting said liner and corrugated core.

11. The process of continuously forming a corrugated paper board assembly comprising a corrugated paper core and a paper liner attached thereto which process includes the steps of continuously applying to one paper portion of said assembly a potential adhesive in a series of spaced relatively narrow applications, said potential adhesive mixture comprising ungelatinized amylaceous material, a soluble borate and a gelatinous aqueous carrier medium, said carrier medium being of such viscous nature as to carry said ungelatinized starch in a state of relatively permanent and uniform suspension and to permit the retention of said viscous mixture substantially as applied without material absorption of the aqueous content by the paper, bringing said paper portion with its applied potential adhesive continuously into contact with the other paper portion to form an assembly and continuously passing said assembly with its potential adhesive through a heating zone whereby sufficient of the ungelatinized starch component is gelatinized in the presence of the soluble borate to thereby render the potential adhesive effective to give an immediate adhesive bond for uniting said liner and corrugated core.

12. A process of continuously forming a corrugated paper board assembly comprising a corrugated paper core and a paper liner attached thereto, which process includes the steps of continuously applying to one paper portion of said assembly a potential adhesive in a series of spaced relatively narrow applications, said potential adhesive mixture comprising ungelatinized amylaceous material having the property of taking up water upon the application of heat suspended in a gelatinous, water-containing, viscous carrier medium, and an agent for increasing the wetting effect of the potential adhesive as applied, bringing the paper portion with the applied potential adhesive continuously into contact with the other paper portion to form an assembly and passing said assembly continuously with its potential adhesive through a heating zone whereby ungelatinized amylaceous material is gelatinized and takes up water from said carrier, the amount of water present in said carrier being sufficient to allow said ungelatinized amylaceous material to become substantially gelatinized within said heating zone, the amount of water present in said carrier being present in such a small proportion that the amount taken up by said ungelatinized amylaceous material will cause an immediate increase in viscosity of said mixture resulting in an adhesive bond for uniting said liner and corrugated core.

13. In a process as defined in claim 6 the preliminary operation consisting of treating said ungelatinized amylaceous material with an amount of starch gelatinizing agent sufficient to lower the temperature at which gelatinization takes place in situ within said heating zone but insufficient to cause gelatinization prior to the heating within said heating zone.

JORDAN V. BAUER.